March 12, 1957   E. W. YETTER   2,785,215
ELECTRONIC TIMING CIRCUIT
Filed April 29, 1952   3 Sheets-Sheet 1

(1) $\dfrac{\phi_o}{360°} = \dfrac{t_o}{T} = \dfrac{k}{a}$  (2) $T = \dfrac{1}{f}$  (3) $t_o = \dfrac{1}{f} \cdot \dfrac{k}{a}$

INVENTOR.
EDWARD W. YETTER
BY
ATTORNEYS.

(4) $e_p = m \cdot \dfrac{1}{f}$ (5) $t_o = KR(b + ce_g)$ (6) $e_g = \dfrac{e_p}{2} + e_c$ (7) $e_c = -\dfrac{b}{c}$ (8) $t_o = \dfrac{KRcm}{2} \cdot \dfrac{1}{f}$

INVENTOR.
EDWARD W. YETTER
BY
ATTORNEYS.

United States Patent Office 2,785,215
Patented Mar. 12, 1957

2,785,215

ELECTRONIC TIMING CIRCUIT

Edward W. Yetter, Ardmore, Pa., assignor to Sun Oil Company, Philadelphia, Pa., a corporation of New Jersey Application April 29, 1952, Serial No. 284,864

6 Claims. (Cl. 123—148)

This invention relates to an electronic timing circuit and particularly to a circuit capable of providing periodic output pulses bearing a definite phase relationship to periodic input pulses irrespective of the frequency of these input pulses.

The present invention may be best understood by considering a particular problem to which it is applicable. It is desirable in the testing of various fuels for internal combustion engines to operate vehicles on the road under various driving conditions using such fuels. Involved in such tests is the matter of timing of the ignition spark, which timing is desirably accurately adjustable over a considerable range. In particular, the spark instant must be accurately set with respect to the phase of the engine cylinder and the timing must be such as to maintain the phase relationship for various speeds of operation of the engine. Since the spark instant may be accurately controlled by the production of a pulse, it will be evident that there is particular use for a timing circuit which will produce pulses bearing a definite angular phase relationship with respect to pulses which are indicative of particular phases of the crank shaft position. The problem is particularly complicated by the fact that the phase relationship must be maintained irrespective of variations of speed or, in other terms, the frequency of the input pulses. In accordance with the present invention, the phase relationship for a wide variety of speeds is set by a single control.

It may be pointed out that a voltage consisting of a series of pulses periodically produced is composed of a very wide band of frequency components so that the usual reactance methods of shifting phases are not suitable. For a given angular phase relationship between two sets of pulses it is necessary that each pulse of the second series should follow a pulse of the first series by a time which is proportional to the reciprocal of the frequency of the pulses.

It is the general object of the present invention to provide a secondary series of pulses related to a first series in accordance with the foregoing considerations.

This object of the invention and secondary objects particularly relating to details of construction and operation will become apparent from the following description, read in conjunction with the accompanying drawings, in which.

Figure 1:
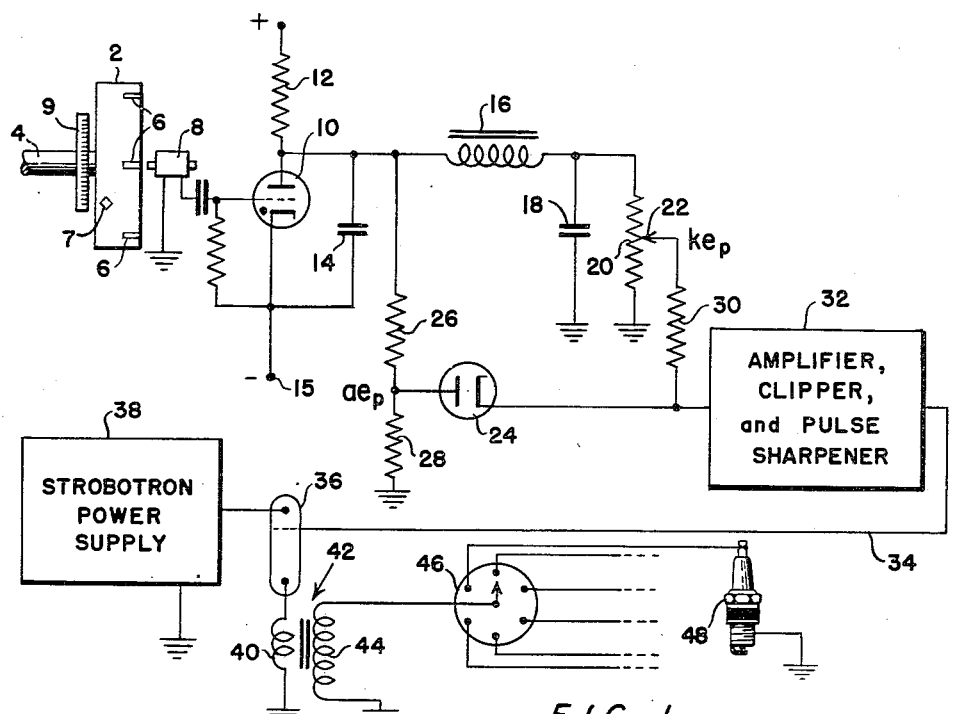
Figure 1 is a wiring diagram showing one type of circuit for accomplishing the objects of the invention, there being indicated in association with the circuit the various elements making it applicable to the timing of ignition sparks of an internal combustion engine.

Referring first to Figure 1, there is indicated at 2 the flywheel of an internal combustion engine carried by the engine shaft 4. On this flywheel there are arranged in predetermined relationship to the cranks a group of magnets 6 which move adjacent to a solenoid 8 to induce pulses therein bearing a definite timed relationship to the crank positions. The pulses thus produced may be otherwise provided by photoelectric means or by electrical contacts. What is desired is a production of pulses bearing definite relationships to the phases of the crank shaft. It will be evident that these pulses will vary in frequency in proportion to the speed of the shaft.

Also carried by the flywheel 2 is a marking 7 or a series of such markings angularly spaced about the flywheel to correspond to one or more of the crank positions. As will be evident hereafter, the marking or markings such as 7 may be stroboscopically illuminated so as to be readable against a fixed scale 9 to indicate the phasing of the spark or sparks produced in relationship to the cranks.

The pulses produced in the solenoid 8 or its equivalent are fed to the grid of a thyratron 10 arranged in a sawtooth generating circuit with a resistor 12 connected between the anode of the thyratron 10 and the positive supply line and with a condenser 14 connected between the anode and cathode of the thyratron. The cathode of the thyratron is connected to a negative terminal 15 having a potential below ground equal to the anode-cathode potential which exists when the thyratron is conducting, the result being that at such time the anode is at ground potential. The production of each pulse from the solenoid 8, or its equivalent, results in firing of the thyratron to discharge the condenser 14 the potential of which then gradually builds up by flow of current through the resistance 12, the thyratron being extinguished after each discharge which occurs in a very short interval. In accordance with usual practice, this sawtooth generator is so arranged as to give a linear rise of anode potential. While this end may be sufficiently closely achieved through the use of a supply potential very considerably in excess of the anode potential at the time of firing, it will be evident that, if desired or necessary, the linearity of the generator may be improved by provision of a constant current input to the anode utilizing a pentode or other well-known arrangement.

The anode of the thyratron is connected to a filter comprising the inductance 16 and condenser 18 to provide at the filter output a potential which will be the average of the potential of the anode, i. e., the average of the potential which will consist of the sum of the minimum potential of the anode at the time of firing plus the linear sawtooth wave. Connected between the filter output and ground is a potentiometer 20, the contact 22 of which may be adjusted to provide the sole phase adjustment required, as will hereafter appear. The potentiometer contact 22 is connected through resistance 30 to the input of a circuit indicated at 32 comprising an amplifier, clipper and pulse sharpener. Since such a circuit may take various forms and is well known, it need not be detailed.

A pair of resistances 26 and 28 is connected between the anode of thyratron 10 and ground and to their junction is connected the anode of a diode 24 the cathode of which is also connected to the input of the circuit 32.

As will appear, the output of the circuit 32 will consist of a series of sharp pulses bearing a definite angular phase relationship to the input pulses at the grid of the thyratron 10. These pulses are delivered along line 34 to the grid of a strobotron 36 which is supplied by a conventional strobotron power supply 38. This power supply provides charging of a condenser which discharges through the strobotron whenever a positive pulse is produced at its grid. The strobotron is arranged to discharge through the primary 40 of a spark coil 42, the secondary 44 of which is connected to the distributor 46 for distribution of sparking potential to the various spark plugs of the engine one of which is indicated at 48. The strobotron, in other words, takes the place of the usual mechanical circuit breaker.

The strobotron may be so positioned that it not only provides the primary pulses for the transformer 42 but also illuminates the marking or markings on the flywheel so that such markings 7 may be read against the scale 9. In this fashion, the timing of the sparks may be accurately determined with respect to the phases of the engine pistons.

Figure 2:
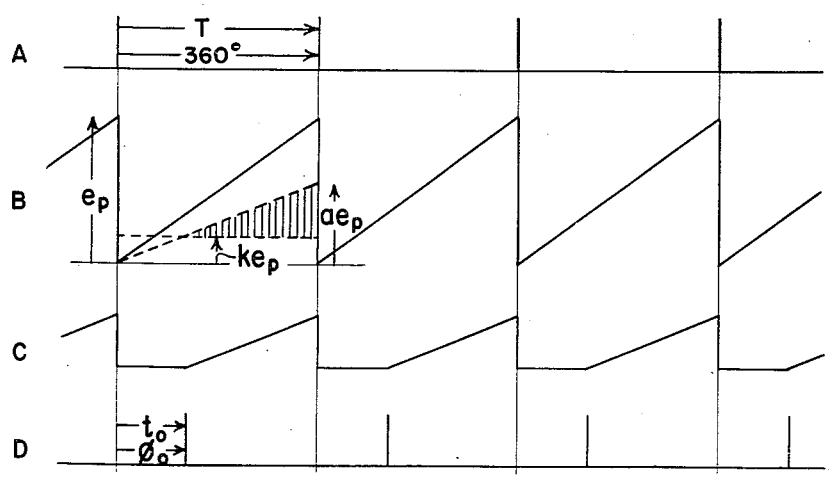
Figure 2 is a diagram showing the relationships of various pulses in the circuit and additionally giving formulae for the better understanding of the operation.

The operation of the circuit may be made clear by considering Figure 2. At A there are indicated sharp pulses produced at the grid of thyratron 10 by the pickup solenoid 8, these pulses, as previously mentioned, bearing definite relationships to the phases of the various engine cylinders. These pulses will have a frequency proportional to the speed of rotation of the engine shaft so that their period T will be equal to the reciprocal of their frequency $f$. Considering electrical angles, they will be spaced by 360°.

At B there is indicated the sawtooth wave produced at the anode of the thyratron. The minimum value of this wave is the ground potential value of the thyratron anode.

The amplitude $e_p$ of the sawtooth wave is, because of linearity of the wave, proportional to the period T.

The potential at the output of the filter will be a direct potential equal to the average of the sawtooth wave. Since this average is half the amplitude of the sawtooth wave there will be provided by reason of the position of the potentiometer contact 22 a potential at the cathode of diode 24 which will be a definite fraction $k$ of the amplitude $e_p$ of the sawtooth wave. This is indicated by the horizontal line associated with the sawtooth wave at B.

At the anode of diode 24 there will be provided a potential which will be a sawtooth wave the amplitude of which will be a definite fraction $a$ of the amplitude of the sawtooth wave at the anode of the thyratron, this fraction being determined by the resistances 26 and 28.

The diode 24 will be cut off so long as its anode potential is negative with respect to its cathode potential but will be conductive when the anode potential exceeds the cathode potential. The result will be, due to the presence of resistance 30, at the cathode of diode 24 of a potential such as indicated at C, the value of this potential being zero (from the standpoint of variations) until the anode potential rises during each cycle to the cathode potential of the diode, the potential of the cathode then rising to correspond with the portion of the sawtooth wave appearing at its anode. The period of conduction of the diode is indicated by the shading at B. The modified sawtooth wave at C is amplified and clipped and by differentiation the rise is sharpened to produce at the output 34 pulses such as are indicated at D which occur at the beginnings of the rises of the wave C. Referring to Equation 1 in Figure 2, it will be evident that the relationship of the electrical phase delay of each pulse of the group at D compared with the corresponding pulse of the group at A will involve a fraction of 360° given by the ratio of $k$ to $a$. It will be noted that this ratio is also equal to the ratio of $t_0$, the time of delay, to the period T. From the geometry involved, it will be evident that the phase angle between corresponding pulses of the two series will be independent of the frequency of the pulses. In other words, as the frequency changes, the phase angle nevertheless remains constant though it may be adjusted by the single adjustment of the potentiometer contact 22. It will thus be evident that there is provided a series of pulses for the firing of the strobotron and production of the ignition sparks such that the phase relationship to the crank shaft remains constant, for a particular setting of the potentiometer contact, irrespective of the speed of the shaft.

It may be noted that, T being equal to the reciprocal of the frequency as indicated in Equation 2, it follows that $t_0$ is proportional to the reciprocal of the frequency as indicated in Equation 3. This is mentioned since it is of particular significance in connection with the modification illustrated in Figure 3.

Figure 3:
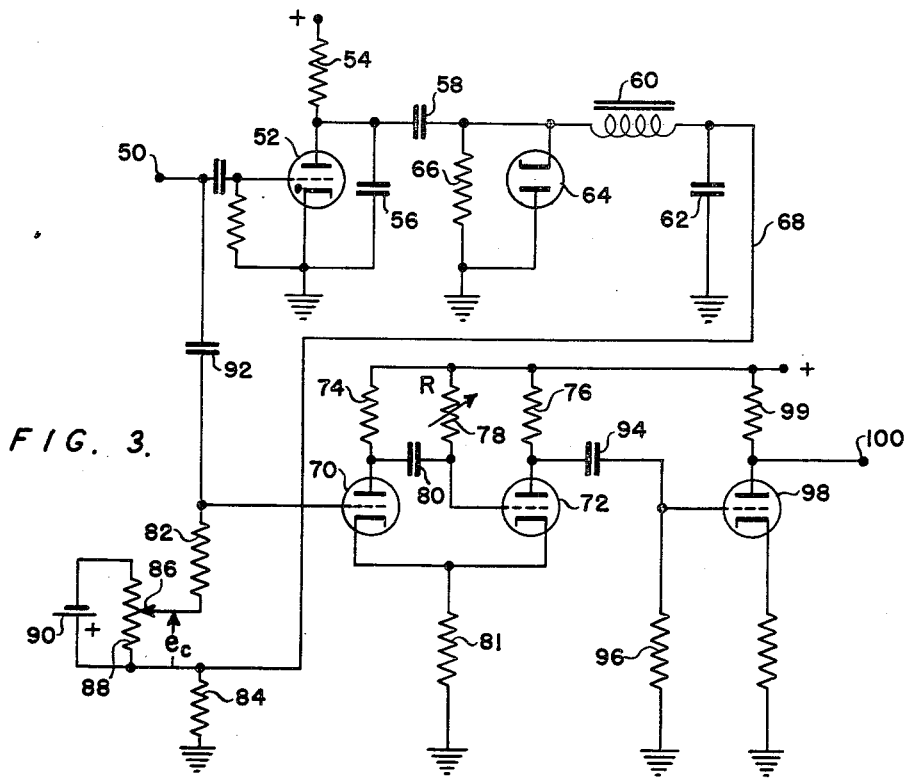
Figure 3 is a circuit diagram similar to Figure 1 but showing an alternative fashion for accomplishment of the invention.

While the circuit shown in Figure 1 is desirable because of its independence of critical adjustments of apparatus, the invention may be carried out in various other fashions of which the circuit of Figure 3 is typical.

Referring to Figure 3, there is indicated at 50 a terminal for the input of pulses such as those provided by the pickup 8 of Figure 1. The terminal 50 is connected to the grid of thyratron 52 arranged in a sawtooth generator circuit in the same fashion as the thyratron in Figure 1, there being provided the anode resistor 54 and the condenser 56 connecting the anode and cathode. The anode of triode 52 is connected through condenser 58 to a low pass filter designed to provide a D. C. output, the filter comprising the inductance 60 and the condenser 62. In the arrangement of Figure 3, however, it is important that the sawtooth input to the filter should have as its minimum potential ground potential and to this end there is provided a direct potential restoring circuit comprising the diode 64 and resistance 66, the anode of the diode being connected to ground and the cathode to the filter input so that the potential at this input cannot drop below ground potential. The result is the output on line 68 of a potential which is the average of the sawtooth potential appearing to the right of condenser 58. The pulses at terminal 50 are indicated at E in Figure 4, the sawtooth wave is indicated at F in Figure 4 and at F there is also indicated by the horizontal dotted line the average of the sawtooth wave.

A pair of triodes 70 and 72 are arranged in a single shot multivibrator circuit, the anodes of these triodes being connected to the positive potential supply line through resistances 74 and 76 while the grid of triode 72 is connected to the same line through a variable resistor 78, the set value of this resistor being indicated by R. As will appear, the adjustment of this value of R is the sole adjustment for phase of the desired output pulses.

A condenser 80 connects the anode of triode 70 and the grid of triode 72. The cathodes of the two triodes are connected to ground through a common resistor 81.

The grid of triode 70 is connected to ground through resistors 82 and 84 with the interposition between them of an arrangement to provide an adjustable but normally fixed potential $e_c$. This arrangement involves a potentiometer 88 connected across the terminals of a battery 90, the movable contact 86 of the potentiometer being connected to the lower end of resistor 82. A condenser 92 is connected between terminal 50 and the grid of triode 70.

The anode of triode 72 is connected through condenser 94 to the grid of triode 98 provided with an anode load resistor 99 and having its anode connected to an output terminal 100. A resistance 96 connected between the grid of triode 98 and ground provides in conjunction with the condenser 94 a differentiating circuit.

The multivibrator arrangement which has been described is of conventional type arranged to provide an output having a predeterminable delay following an input pulse. The triode 72 is normally conducting while the triode 70 is normally cut off. When a positive pulse is applied to the grid of triode 70, the two triodes change their states, the triode 70 becoming conductive while the triode 72 is cut off. Then after a predetermined time, the circuit reverts back to its initial condition, the triode 72 becoming suddenly conductive while the triode 70 is cut off. The output potential at the anode of triode 72 is indicated at G in Figure 4.

Figure 4:
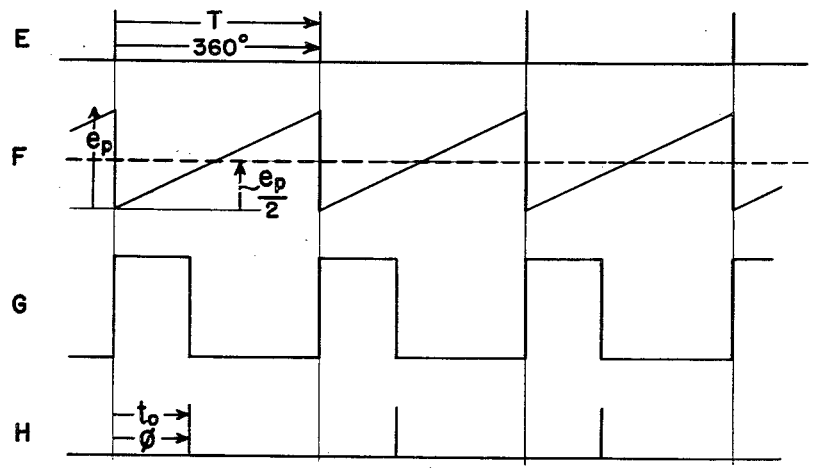
Figure 4 is similar to Figure 2 but showing various relationships involved in the circuit of Figure 3.

The operation of the circuit will be best made clear by considering the equations in Figure 4. At (4), there is indicated the fact that the peak potential of the sawtooth wave is inversely proportional to the frequency and this, of course, is then also true of the average value of the sawtooth wave which is equal to one-half the peak value.

The Equation 5 gives the duration $t_0$ of the labile state of the multivibrator in terms of the resistance R, the potential $e_g$ of the grid of triode 70 and the constants K, $b$, and $c$. The grid potential here given is the constant potential following the application of a short pulse tripping the multivibrator from its stable to its labile state.

As will be evident from the circuit, the equation at (6) is true, the potential of the grid of triode 70 being, following receipt of a tripping pulse, equal to the average potential of the sawtooth wave plus a potential introduced by the potentiometer-battery combination. If, then, the potential thus supplied by the battery and potentiometer is adjusted to conform to Equation 7, there follows Equation 8 giving the value of $t_0$ in terms of a constant term times the reciprocal of the frequency. It will be noted that this Equation 8 conforms with Equation 3 previously referred to, i. e., the delay of the desired pulse indicated at H with respect to an input pulse corresponding thereto must be proportional to the reciprocal of the frequency. It follows that the phase difference of the respective pulses will then be constant in terms of electrical angle.

The actual operation of the circuit of Figure 3 will be now evident. The multivibrator will be tripped by the application of a pulse of the input series through condenser 92 and will restore to its stable state after a period determined by the adjustment of resistance 78 in accordance with Equation 8. The result is an output at terminal 100 of a pulse for each input pulse but delayed by an adjustable phase angle which is independent of frequency. The output pulse at 100 may, after amplification and other desirable pulse forming operations, be utilized for the firing of a strobotron in the same fashion as illustrated in Figure 1.

Figure 5:
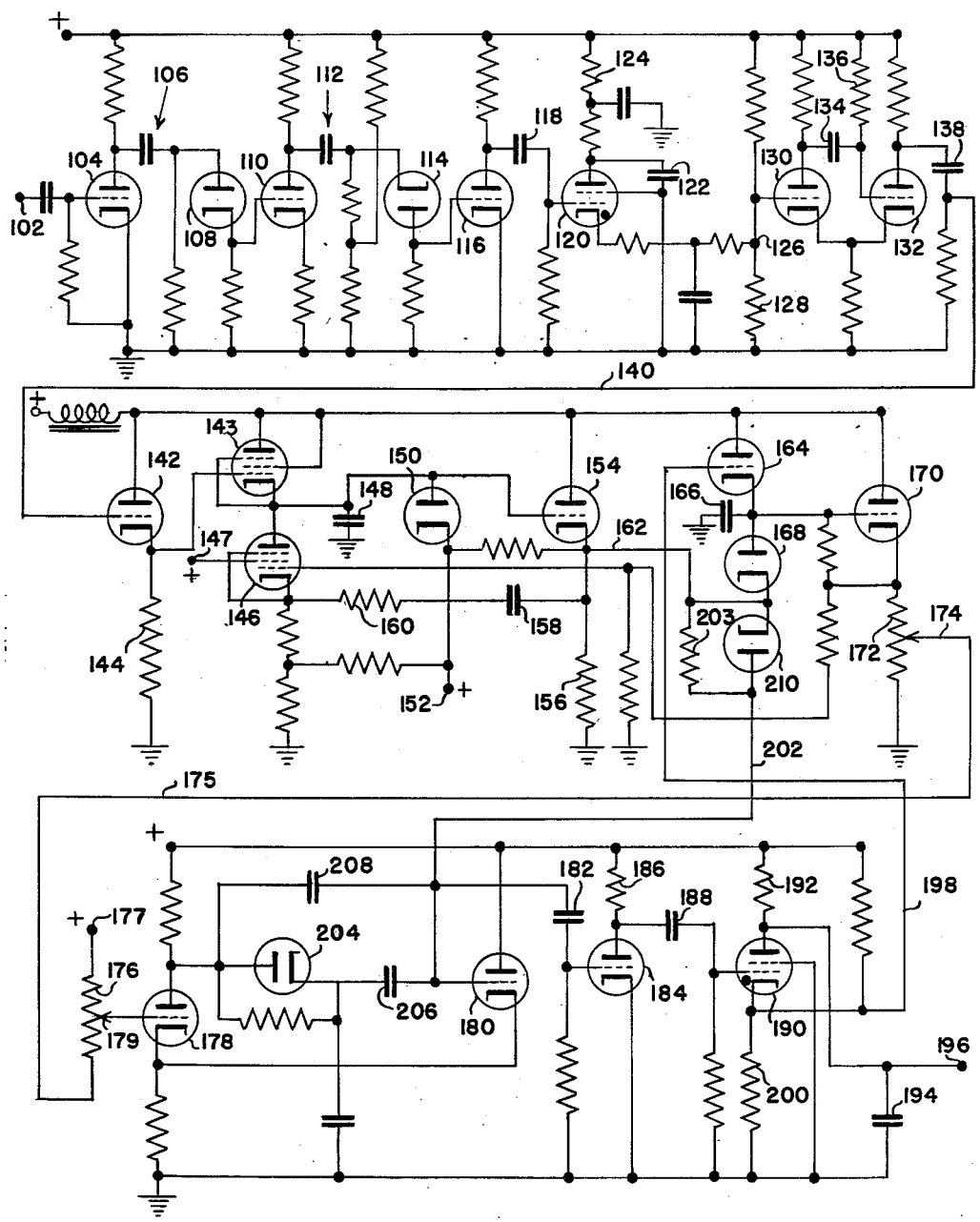
Figure 5 is a circuit diagram illustrating a preferred embodiment of the invention including refinements conducive to the achievement of results to a high degree of precision.

Figure 5 illustrates a preferred embodiment of the invention for conditions in which a high degree of accuracy of timing is required.

At the terminal 102 there is introduced the initiating signal either from a magnetic or photoelectric pickup as previously described. Terminal 102 is connected to the grid of an amplifying triode 104 the output from the anode of which is differentiated by the condenser-resistor arrangement shown at 106, and clipping is effected by the diode 108 to provide a positive pulse to the grid of a second amplifying triode 110. The output of this triode is differentiated by the condenser-resistor arrangement at 112 and clipping is again effected by the diode 114 to provide a sharp negative pulse to the grid of amplifying triode 116. This in turn delivers a sharp positive pulse through condenser 118 to the grid of a thyratron 120.

The thyratron 120 has its anode connected to the positive supply line through the resistance arrangement at 124 which serves for the charging of the condenser 122 which discharges through the thyratron upon firing in response to the positive grid pulse just mentioned. A pair of triodes 130 and 132 are connected in a monostable multivibrator arrangement including the condenser 134 connected between the anode of triode 130 and the grid of triode 132 and the resistance 136 connecting the grid of triode 132 to the positive supply line. Triode 132 is normally conducting but is cut off upon receipt of a positive pulse at the grid of triode 130 from the terminal 126 in the resistance arrangement 128 provided between the thyratron cathode and ground. The multivibrator is desirably designed to return to its stable condition after a very short interval of one to two microseconds.

The overall function of the portion of the circuit so far described is to provide a short pulse of determined duration through the condenser 138 to the connecting line 140 upon the occurrence of the input signal pulse at the terminal 102 from the engine shaft.

The line 140 connects to the grid of a triode 142 connected in a cathode follower arrangement with a resistance 144. The cathode of triode 142 is connected to the control grid of a pentode 143 which functions as a switch. The cathode of pentode 143 is connected to the ungrounded side of a condenser 148 which is also connected to the anode of a pentode 146 arranged in a constant current circuit and in particular having its screen connected to a terminal 147 of positive well regulated potential. A diode 150 has its anode connected to the ungrounded terminal of condenser 148 and its cathode connected to a terminal 152 which is supplied with an accurately regulated constant potential. The ungrounded side of condenser 148 is connected to the grid of a triode 154 in a cathode follower arrangement including the cathode resistor 156. A feed-back from the cathode of triode 154 to the cathode of pentode 146 is provided by the condenser 158 and resistance 160. This last mentioned feed-back provides improvement in linearity, i. e., constant current characteristic, of pentode 146.

The portion of the circuit just described has the function of providing an accurate sawtooth wave of linear characteristic. Upon the occurrence of the short pulse on line 140 the pentode 144 is rendered conductive for the period of this short pulse and serves to provide current flow to charge the condenser 148. Due, however, to the presence of diode 150 the ungrounded terminal of this condenser cannot be charged above the potential of the terminal 152 which as stated is accurately regulated. Immediately following the cessation of the short pulse provided along line 140 the condenser 148 will start to discharge through the pentode 146 and its cathode resistance arrangement. A linear drop of potential of condenser 148 then occurs, the drop continuing until the next pulse on line 140 effects recharging of the condenser.

The resulting sawtooth wave is emitted at the cathode of triode 154 along connection 162 to the cathode of diode 168, the anode of which is connected to the ungrounded terminal of a condenser 166 and to the cathode of a triode 164. As will shortly appear, the triode 164 has applied to its grid at the time of firing of a strobotron and hence the occurrence of a spark, a positive pulse which renders it conductive to connect the condenser 166 to the positive supply line to effect charging of the condenser. This charging occurs in a very short interval and while the potential of the cathode of triode 154 is still falling along the sawtooth wave. As soon as the supply potential to the condenser 166 is cut off, its potential must fall to the value of the potential at the cathode of diode 168, i. e., the potential of the cathode of triode 154 and as this potential continues to decrease the potential of the condenser 166 follows until the end of the sawtooth slope. When, however, the rise of the sawtooth occurs the diode 168 will prevent charging of the condenser 166 in a positive direction and hence the ungrounded terimnal of condenser 166 retains a potential which is equal to the minimum potential of the sawtooth wave at the cathode of triode 154. This potential is maintained until recharging of the condenser occurs upon the occurrence of a spark. As will appear the condenser 166 will thus maintain the minimum potential of the sawtooth wave through the period required for operation.

A triode 170 in a cathode follower arrangement with a potentiometer resistance 172 has its grid connected to the ungrounded terminal of condenser 166. The adjustable contact 174 of the potentiometer is connected through line 175 to one end of a potentiometer resistance 176 the other end of which is connected to a terminal 177 of accurately regulated constant potential. The contact 179 of potentiometer 176 which serves as the phase adjustment of this apparatus is connected to the grid of a triode 178 which is associated with a second triode 180 in a monostable multivibrator arrangement which in this instance is of a type to provide regenerative gain at the instant of tripping to its labile state. Passing for the moment the details of this multivibrator, the grid of triode 180 is connected through condenser 182 to the grid of a triode 184 arranged as an amplifier with the anode load resistor 186. The anode of triode 184 is connected through condenser 188 to the control grid of a thyratron 190 which is provided with an anode resistor 192 and a cathode resistor 200. The anode of thyratron 190 is connected to the ungrounded terminal of a condenser 194 and to the output terimnal 196 along which a pulse is emitted during operation for the firing of a strobotron and production of a spark as heretofore described. The cathode of thyratron 190 is connected at 198 to the grid of triode 164 and serves to provide the positive pulse mentioned heretofore which renders the triode 164 conductive to charge the condenser 166 at the time of occurrence of the spark.

The grid of triode 180 is connected by line 202 to the anode of a diode 210 the cathode of which is connected to the cathode of triode 154. This diode is bypassed by a resistor 203. The arrangement here is such as to prevent the grid of triode 180 from going positive with respect to the input from the cathode of triode 154. Regenerative action at the multivibrator comprising the triode 178 and 180 is provided by the connections including condenser 208 and the arrangement of diode 204 and condenser 206 in series connecting the anode of triode 178 to the grid of triode 180.

The operation of the circuit from the standpoint of providing a constant phase angle may now be described. From the potentiometer 172 through contact 174 and line 175 there is applied to the lower end illustrated of potentiometer resistance 176 a potential which is linearly proportional to the minimum value of the sawtooth potential. The upper end of potentiometer 176 is connected to the constant potential of terminal 177. The contact 179 of potentiometer 176 accordingly supplies to the grid of triode 178 a potential which is linearly related to the potentials at 177 and on line 175 and is intermediate these potentials. The grid of triode 178, in other words, is at a potential higher than that of the minimum of the sawtooth and is at this potential from the time the sawtooth reaches its minimum until the time when the spark should occur.

During this same time the grid of triode 180 is subjected to the sawtooth potential which is dropping toward its minimum. So long as the potential of the grid of triode 180 exceeds the potential of the grid of triode 178 the multivibrator will remain in the state in which triode 180 is conducting and triode 178 is cut off.

When the potential of the grid of triode 180 drops to the potential of the grid of triode 178 the multivibrator will be tripped to the condition in which triode 178 is conducting and triode 180 is cut off. This emits a pulse causing firing of thyratron 190 and the emission of a firing pulse to the strobotron.

The general principles of operation involved may be readily seen by considering that the circuit of Figure 5 operates substantially similarly to the circuit of Figure 1 with the exception that the base of reference is the maximum value of the sawtooth wave determined by the regulated potential at terminal 152. By means of the zero adjustment by contact 174 of potentiometer 172 the reference level for the potential of the grid triode 178 may be brought to the same reference level as that of the grid of triode 180. Again therefore it is the equality between a direct potential and a sawtooth potential which determines the instant of firing to maintain constant the angular phase relationship of the spark to a datum time. As will be evident from the foregoing the constant potential level which is held during the cycle is proportional to the amplitude of the sawtooth wave giving rise to a proper mode of operation.

It will be evident from the foregoing that the invention may be carried out in various ways and it is therefore to be understood that it is not limited except as required by the following claims.

What is claimed is:

1. In combination with an internal combustion engine having a rotating shaft and means controlling operation of at least one cylinder thereof, means providing periodic primary electrical pulses in fixed phase relationship with the rotation of said shaft, means providing secondary electrical pulses, each bearing a predetermined adjustable angular phase relationship to a corresponding primary pulse irrespective of the frequency of the latter, and devices through which said secondary pulses control the timing of said controlling means.

2. In combination with an internal combustion engine having a rotating shaft and means controlling operation of at least one cylinder thereof, means providing periodic primary electrical pulses in fixed phase relationship with the rotation of said shaft, means determining a time period inversely proportional to the speed of said shaft, means providing secondary electrical pulses, each having its angular phase relationship to a corresponding primary pulse fixed by said time period so as to be constant irrespective of the shaft speed, and devices through which said secondary pulses control the timing of said controlling means.

3. In combination with an internal combustion engine having a rotating shaft and means controlling operation of at least one cylinder thereof, means providing periodic primary electrical pulses in fixed time relationship with the rotation of said shaft, adjustable means determining a time period inversely proportional to the speed of said shaft, means providing secondary electrical pulses, each having its angular phase relationship to a corresponding primary pulse fixed by said time period so as to be constant, for a fixed adjustment of said adjustable means, irrespective of the shaft speed, and devices through which said secondary pulses control the timing of said controlling means.

4. In combination with an internal combustion engine having a rotary shaft and means providing spark ignition of at least one cylinder thereof, means providing periodic primary electrical pulses in fixed phase relationship with the rotation of said shaft, means providing secondary electrical pulses, each bearing a predetermined adjustable angular phase relationship to a corresponding primary pulse irrespective of the frequency of the latter, and devices through which said secondary pulses control the timing of said spark ignition providing means.

5. In combination with an internal combustion engine having a rotary shaft and means providing spark ignition of at least one cylinder thereof, means providing periodic primary electrical pulses in fixed phase relationship with the rotation of said shaft, means determining a time period inversely proportional to the speed of said shaft, means providing secondary electrical pulses, each having its angular phase relationship to a corresponding primary pulse fixed by said time period so as to be constant irrespective of the shaft speed, and devices through which said secondary pulses control the timing of said spark ignition providing means.

6. In combination with an internal combustion engine having a rotary shaft and means providing spark ignition of at least one cylinder thereof, means providing periodic primary electrical pulses in fixed phase relationship with the rotation of said shaft, adjustable means determining a time period inversely proportional to the speed of said shaft, means providing secondary electrical pulses, each having its angular phase relationship to a corresponding primary pulse fixed by said time period so as to be constant, for a fixed adjustment of said adjustable means, irrespective of the shaft speed, and devices through which said secondary pulses control the timing of said spark ignition providing means.

References Cited in the file of this patent

UNITED STATES PATENTS

| | | |
|---|---|---|
| 2,430,154 | Woodward | Nov. 4, 1947 |
| 2,466,044 | Schoenfeld | Apr. 5, 1949 |
| 2,490,960 | Hanchett | Dec. 13, 1949 |
| 2,604,515 | McNulty | July 22, 1952 |
| 2,645,751 | Byerlay | July 14, 1953 |